(12) United States Patent
Hofmann

(10) Patent No.: US 12,320,075 B2
(45) Date of Patent: Jun. 3, 2025

(54) METHOD FOR REPROFILING AT LEAST ONE RAIL

(71) Applicant: MATE GmbH, Kirchham bei Vorchdorf (AT)

(72) Inventor: Stefan Hofmann, Steyrermuehl (AT)

(73) Assignee: MATE GmbH, Kirchham bei Vorchdorf (AT)

( * ) Notice: Subject to any disclaimer, the term of this patent is extended or adjusted under 35 U.S.C. 154(b) by 0 days.

(21) Appl. No.: 17/782,394

(22) PCT Filed: Dec. 4, 2020

(86) PCT No.: PCT/AT2020/060432
§ 371 (c)(1),
(2) Date: Jun. 3, 2022

(87) PCT Pub. No.: WO2021/108826
PCT Pub. Date: Jun. 10, 2021

(65) Prior Publication Data
US 2023/0018816 A1  Jan. 19, 2023

(30) Foreign Application Priority Data
Dec. 4, 2019  (AT) ............... A 51056/2019

(51) Int. Cl.
  *B23P 23/04*  (2006.01)
  *B23P 6/00*  (2006.01)
  *E01B 31/13*  (2006.01)

(52) U.S. Cl.
  CPC ............. *E01B 31/13* (2013.01); *B23P 6/00* (2013.01); *B23P 23/04* (2013.01); *Y10T 29/49718* (2015.01); *Y10T 29/49726* (2015.01)

(58) Field of Classification Search
  CPC ......... Y10T 29/49726; Y10T 29/49718; B23P 6/00; B23P 23/04; E01B 31/13
  See application file for complete search history.

(56) References Cited

U.S. PATENT DOCUMENTS 1,887,424 A * 11/1932 Perazzoli ............... E01B 31/13
                                                   409/178
4,295,764 A    10/1981 Theurer et al.
(Continued)

FOREIGN PATENT DOCUMENTS

AT  391 285 B   3/1990
AT  521 163 A4  11/2019
(Continued)

OTHER PUBLICATIONS

International Search Report in PCT/AT2020/060432, mailed Mar. 25, 2021.

*Primary Examiner* — Jermie E Cozart
(74) *Attorney, Agent, or Firm* — Collard & Roe, P.C.

(57) ABSTRACT

In a reprofiling method of a rail (2) of a laid rail track (1) during a travel movement of a machining vehicle (13) along a rail track (1) in a section of its running surface (10) located on the rail head (5), a machining unit (14) includes a first and a second machining aggregate (16, 20). In a first machining step, material is removed in a milling process. In this process, a surface corrugation with corrugation crests (18) and corrugation troughs (19) is formed. In the second machining step, the surface corrugation is reduced by plastic deformation of the corrugation crests (18) by at least one forming force (21) directed towards the running surface (10) to be machined and applied in a pulsating manner.

20 Claims, 5 Drawing Sheets

(56) References Cited

U.S. PATENT DOCUMENTS

| | | | |
|---|---|---|---|
| 4,327,568 A | 5/1982 | Berstein | |
| 5,549,505 A | 8/1996 | Jaeggi | |
| 6,033,166 A * | 3/2000 | Hampel | B23C 3/005 |
| | | | 409/178 |
| 6,746,307 B2 | 6/2004 | Knoll et al. | |
| 2003/0129926 A1* | 7/2003 | Knoll | E01B 31/17 |
| | | | 451/49 |
| 2012/0288342 A1 | 11/2012 | Rungger | |
| 2020/0086392 A1* | 3/2020 | Maldaner | B23B 11/00 |
| 2021/0308820 A1 | 10/2021 | Kubin et al. | |

FOREIGN PATENT DOCUMENTS

| | | |
|---|---|---|
| DE | 29 20 889 A1 | 11/1980 |
| EP | 0 465 683 A1 | 1/1992 |
| EP | 1 820 902 A1 | 8/2007 |
| JP | S54-136491 A | 10/1979 |
| JP | S55-157475 A | 12/1980 |
| JP | H07-229103 A | 8/1995 |
| JP | 2008-284632 A | 11/2008 |
| JP | 2021-533292 A | 12/2021 |
| RU | 2 267 570 C2 | 1/2006 |

\* cited by examiner

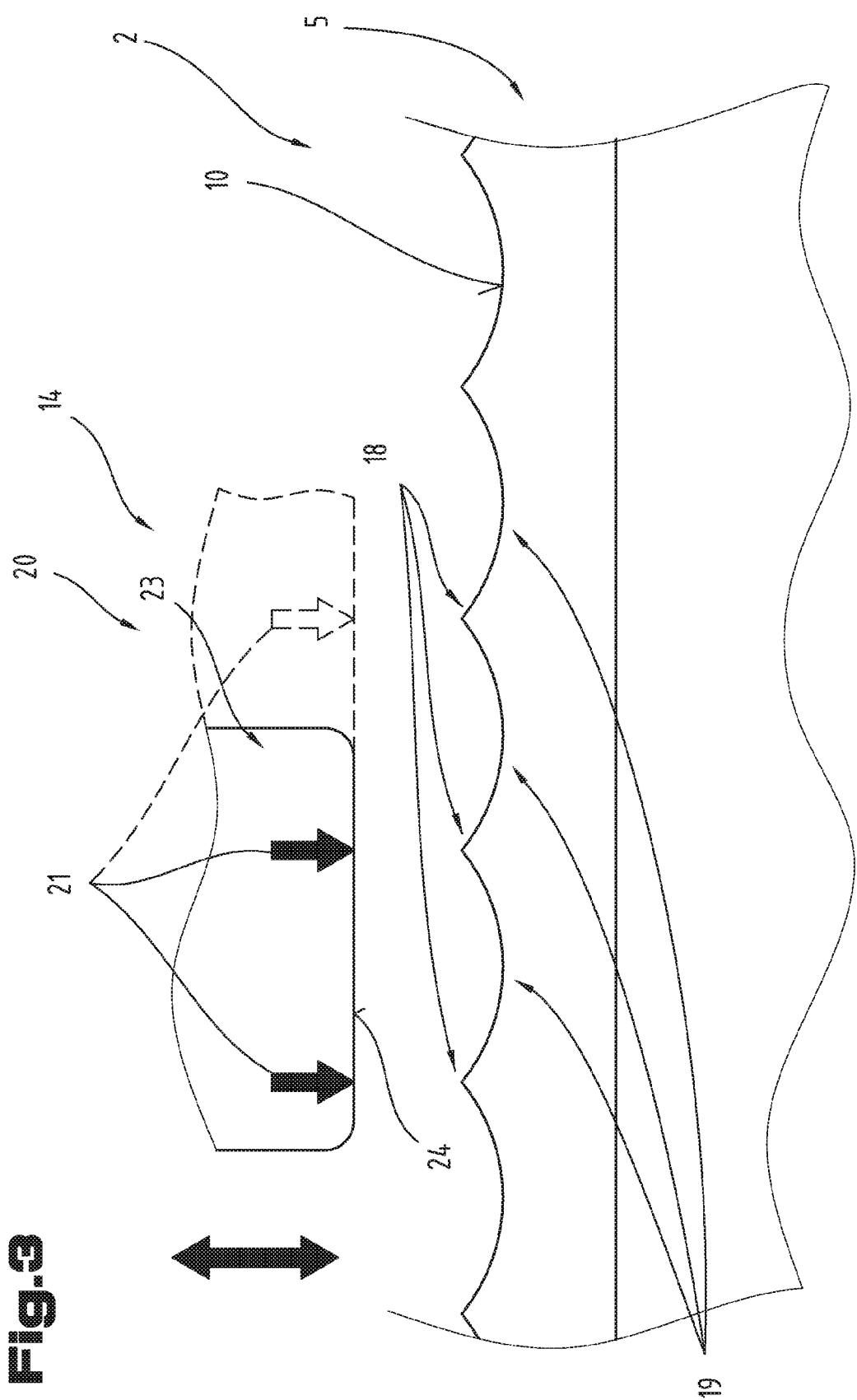

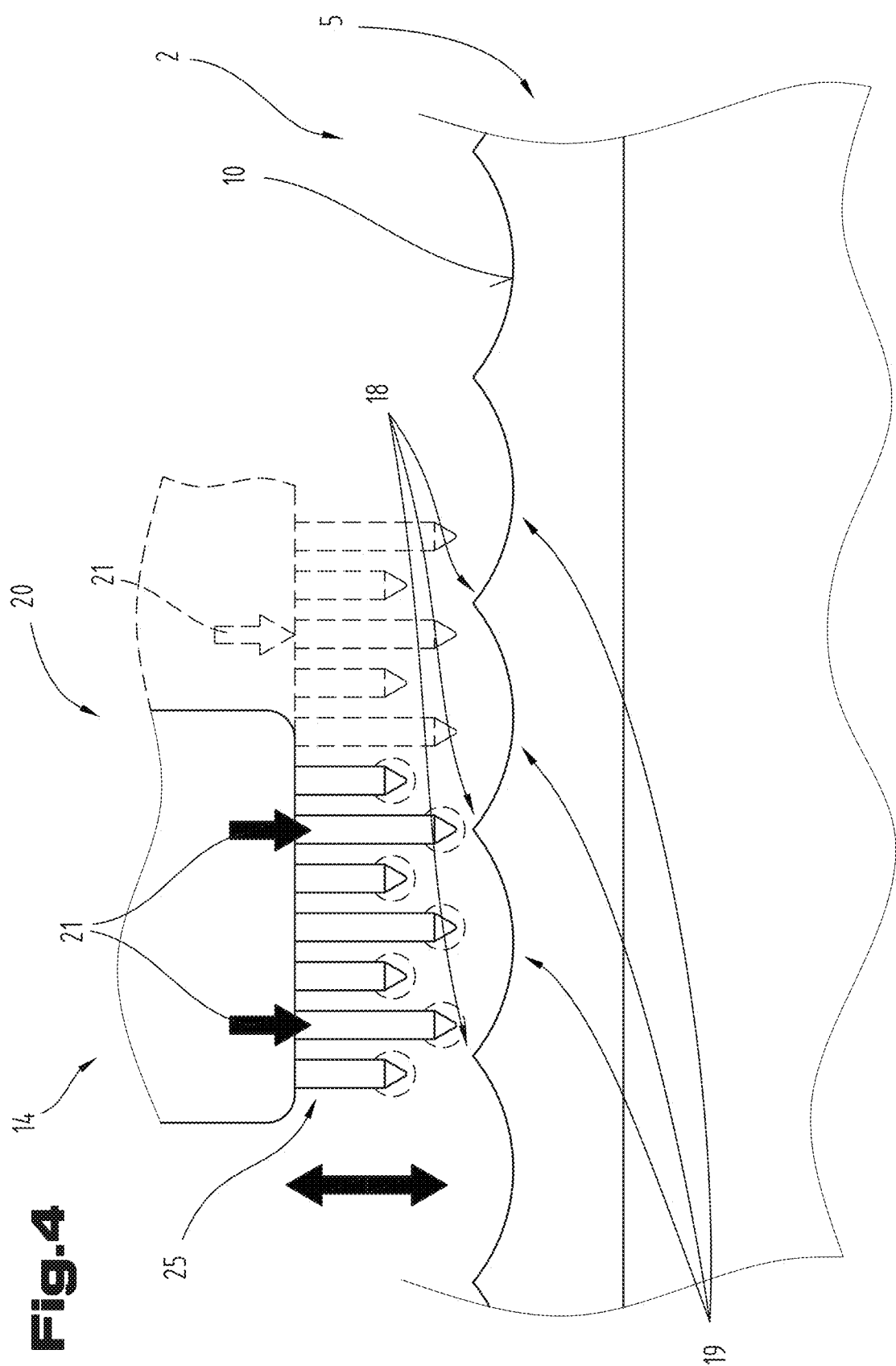

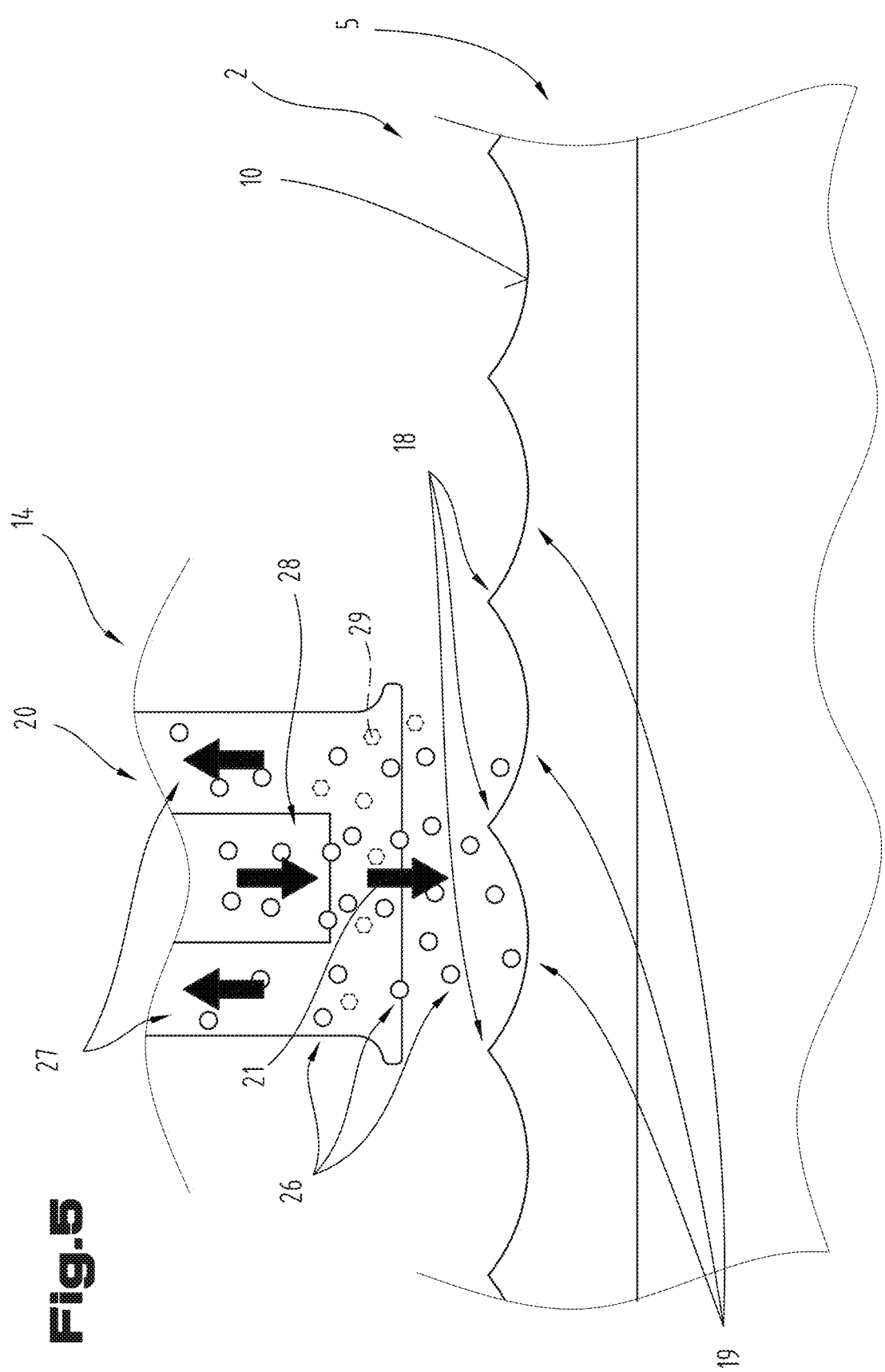

METHOD FOR REPROFILING AT LEAST ONE RAIL

CROSS REFERENCE TO RELATED APPLICATIONS

This application is the National Stage of PCT/AT2020/060432 filed on Dec. 4, 2020, which claims priority under 35 U.S.C. § 119 of Austrian Application No. A51056/2019 filed on Dec. 4, 2019, the disclosure of which is incorporated by reference. The international application under PCT article 21(2) was not published in English.

BACKGROUND OF THE INVENTION

1. Field of the Invention

The invention relates to a method for reprofiling at least one rail at least in the section of its running surface located on the rail head.

2. Description of the Related Art

When reprofiling track rails by means of a milling process with a multi-track milling cutter head, so-called milling corrugations occur in the individual milling tracks. These are periodic patterns of elevations and indentations alternating in the direction of travel which, although hardly visible, must nevertheless be eliminated. This can be done, for example, by grinding or sliding grinding stones. However, belt grinders or face milling cutter can also be used for this purpose. It has been found through measurements that these milling corrugations, if not removed, have a significant effect on the noise pollution of the railroad traveling on the tracks. In particular, it has been found that the shape and arrangement, and possibly the period length, of these corrugations have a measurable effect on the sound emitting properties of the track rails. According to the EN 13231 standard, corrugation would be permissible within certain limits, but in practice this resulted in excessively high noise levels during travel operation, especially at higher speeds.

The reprofiling of the rail head can be carried out either by the machining unit with its machining aggregates being in a stationary position and the rail to be machined being moved relative to it, or by the rails already being laid in a track bed in a rail track formed from them and the machining vehicle with the machining unit being traversed along the laid rail track and the machining being carried out in the process.

DE 29 20 889 A1 discloses a method for cold rolling of components with a non-zero rolling force, whereby the rolling force pulses with a varying frequency and amplitude, whereby the deepest indentations of the rolling tools resulting from a minimum value, as far as they would occur under static load, follow one another at a distance which is not greater than twice the indentation width itself.

EP 0 465 683 A1 discloses a method for the mechanical treatment of the running surface of rails for rail vehicles to prevent corrugation, wherein the rail surface is shot peened, at least in the region of the running surface, with an Almen value which satisfies the formula $A=B \times Z^2+C$, wherein the shot peening is carried out at ambient temperature.

AT 391 285 B discloses a device for compacting and consolidating rail parts, with which impact forces are applied intermittently, a plurality of hammer tools being mounted in a common tool carrier so as to be drivable to intermittent impact strokes, and furthermore an abutment being provided for fixing the rail part to be treated. The tool carrier and/or the abutment are mounted so as to be movable relative to one another in the longitudinal direction of a running surface of the rail part and are reversibly drivable, the hammer tools being releasably connected to the contour of the surface of the rail part in the impact pieces corresponding to the areas of the surface to be treated.

AT 521 163 A4 of the same applicant describes a method and a device for machining the running surface of a rail with the aid of at least one rotating, chip-removing forming tool which can be moved along the rail and pressed at least against its running surface. Furthermore, after machining with the chip-removing forming tool, at least one rolling body adapted to the shape-machined rail surface is rolled over the rail, with cold deformation of the running surface of the rail, in order to level out unevenness of the running surface of the rail. The rolling body, acting as a roller rolls with its shell constantly pressed against the running surface of the rail, whereby the generatrix of the shell surface rolling on the running surface about an axis corresponds to the cross-section of a shaped-machined, i.e. already reprofiled, rail surface. A constant high contact pressure is exerted on the rail by the rolling body during the travel movement. Due to the high contact pressure, a correspondingly small contact area with the rail results in a pressure that causes the desired cold deformation. This method has proven itself in practice, but it has not been possible to apply it to all types of processing machines because of the high contact pressure that has to be applied. The possible contact pressure is essentially dependent on the intrinsic mass of the respective processing machine.

In EP 1 820 902 A1 of the same applicant, a method for milling rail heads of track rails laid in a bedding by means of a movable milling device was also proposed. The milling device comprises a rotationally driven milling cutter head, which is mounted in a carriage containing a milling cutter head drive. The milling cutter head is guided vertically and/or laterally by guide means along the rail head to be machined, the milling cutter head having a plurality of sets of cutter head cutting edges arranged in series in the circumferential direction of the milling cutter head. Each set of cutter head cutting edges reproduces the profile of the rail head to be machined in approximately circular partial arcs of different radii. The object was to avoid reworking the corrugation formed during the milling process. In practice, however, this could only be achieved very rarely and only under the best possible conditions. In most cases, however, this required very long machining times, which in turn meant that the rail track to be machined or the track laid had to be blocked for longer periods of time. In order to shorten the machining times, additional reworking of the running surface was again necessary.

However, the mostly applied reworking step of grinding has some disadvantages. Sparks can fly during the grinding process, which can cause a fire to break out. Furthermore, it was not easy to extract the resulting grinding dust, which increased the environmental impact to a certain extent. Furthermore, the dust exposure also represented an additional health risk for the operating personnel of the machining vehicle. The grinding process leads to martensite formation in the rail material of the machined surface section, which increases the risk of fracture of the ground surface section.

SUMMARY OF THE INVENTION

The object of the present invention was to overcome the disadvantages of the prior art and to provide a method for reprofiling rails with which a shortened machining time with low surface corrugation can be achieved.

This object is solved by a reprofiling method according to the invention.

The method according to the invention is used for reprofiling at least one rail of a track laid and formed by the rails, the machining being carried out at least in the section of its running surface located at the rail head. The following steps are provided:

providing of a machining vehicle, wherein the machining vehicle can be traveled along the rail track, providing a machining unit, wherein the machining unit is arranged on the machining vehicle and the machining of the running surface to be machined is carried out during the travel of the machining vehicle, the machining unit comprising at least a first machining aggregate with at least one rotationally driven chip-removing machining tool, wherein the at least one machining tool is formed as a milling wheel with a plurality of cutter head cutting edges arranged circumferentially one behind the other and aligned along the rail head profile to be reprofiled, at least one second machining aggregate, machining the rail head in the section of its running surface in a first machining step by means of the at least one chip-removing machining tool, wherein in the first machining step the material removal is carried out in a milling process, and a surface corrugation with corrugation crests and corrugation troughs is formed during this material removal in the direction of the longitudinal extension of the rail, and the surface corrugation is reduced and/or modified in a subsequent second machining step by means of the second machining aggregate,—wherein during the reduction of the surface corrugation in the second machining step, at least the corrugation crests are plastically deformed and leveled, and wherein the plastic deformation of at least the corrugation crests is performed by means of at least one forming force directed towards the running surface to be machined, and thus it is further provided that at least one forming force is applied in a pulsating manner and thus the material of the rail is slightly displaced and that in the second machining step there is no continuous contact of a machining tool of the second machining aggregate with the running surface to be machined.

The advantage of this procedure is that the reprofiling is carried out in an economical and thus shorter machining time. This means that the rails are available again for installation and the associated driving operation after a shorter machining time. Furthermore, the otherwise occurring dust load is avoided and the surface corrugation of the running surface formed during the milling process is reduced. This in turn considerably reduces the noise pollution that would otherwise occur during the travel. The plastic forming of at least the corrugation crests or elevations in the longitudinal profile of the running surface results in a surface hardening and thus in a subsequent longer service life.

Since a machining vehicle is provided and the machining unit is arranged on the machining vehicle, and the machining vehicle can travel along a laid rail track formed by rails, the machining of the running surface to be machined is carried out during the travel of the machining vehicle.

The advantage of this procedure is that the reprofiling is carried out in an economical and thus shorter machining time, and the blockage of the rail track to be machined is shortened. This means that the rail track is available again for the intended operation after a shorter time. Furthermore, the dust load that would otherwise occur is avoided and the surface corrugation of the running surface formed during the milling process is nevertheless reduced and/or modified. This in turn considerably reduces the noise pollution that would otherwise occur during the travel operation. The plastic forming of at least the corrugation crests or elevations in the longitudinal profile of the running surface results in surface hardening and thus in a subsequent longer service life of the rail.

Furthermore, the at least one forming force is applied in a pulsating manner. The pulsating application of the forming force has the advantage that the machining tool of the second machining aggregate is not in constant contact with the running surface to be machined. This means that the machining vehicle is moved further with a lower propulsive force or with a lower drive power. A method variant in which at least one guide means is provided for guiding at least one of the machining aggregates vertically and/or laterally relative to the rail head to be machined is also advantageous. The provision of at least one guide means makes it possible to adapt and guide at least one of the machining units for carrying out the reprofiling process to the predetermined geometric dimensions of the rail. Preferably, each of the machining aggregates is assigned its own guiding means, whereby a higher guiding accuracy and, associated therewith, a more precise reprofiling of the rail head in the area of its running surface can be carried out.

Another approach is characterized by applying the at least one forming force in a normal orientation towards the running surface to be machined. Thus, a uniform forming of at least the corrugation crests or elevations to be formed can be carried out during the second machining step. Furthermore, the flatness or the deviation from a straight nominal line or nominal plane can be minimized.

A method variant is also advantageous in which the at least one forming force applied in a pulsating manner originates from a force value range whose lower limit is 20 N, in particular 150 N, and whose upper limit is 80 kN, in particular 1.5 kN.

Depending on the selected method and the chosen means for applying the pulsating forming force, force value ranges with a lower limit of 20 N and an upper limit of 50 N, or with a lower limit of 150 N and an upper limit of 1.5 kN, or with a lower limit of 20 kN and an upper limit of 80 kN can be selected, for example.

By defining a predetermined range of force values, the extent of reforming on the rail surface can be adapted to the respective conditions after the milling process.

Another procedure is characterized by the application of at least one pulsating forming force with a pulsating intensity. With the pulsating intensity of the forming force within certain predefined limits, variable adaptation to different operating conditions can be achieved during the leveling of the rail running surface.

Furthermore, a procedure is advantageous in which the at least one forming force applied in a pulsating manner is applied at a frequency which originates from a frequency value range whose lower limit is 100 Hertz (Hz), in particular 500 Hertz (Hz), and whose upper limit is 25 kilohertz (kHz), in particular 3 kilohertz (kHz).

Depending on the selected process and the chosen means for applying the pulsating forming force, frequency value ranges with a lower limit of 100 Hertz (Hz) and an upper limit of 350 Hertz (Hz), or with a lower limit of 500 Hertz (Hz) and an upper limit of 3 kilohertz (kHz), or even with a lower limit of 5 kilohertz (kHz) and an upper limit of 25 kilohertz (kHz) can be selected, for example.

This means that, within predefined limits, the number of strokes can be better adapted to the corrugation to be machined.

A further advantageous procedure is characterized in that the at least one forming force applied in a pulsating manner is applied with a uniform frequency or with a changing frequency. This makes it easier to prevent any superimposition of oscillations.

A further advantageous procedure is characterized in that the second machining aggregate comprises at least one forming tool. By equipping the second machining aggregate with at least one forming tool, the forming force to be applied towards the running surface of the rail head to be machined can thus be applied in the manner of a hammer movement.

A method variant in which the at least one forming tool has a working surface facing the running surface of the rail head to be machined is also advantageous, the working surface being formed with a longitudinal extension which extends over at least two, preferably over at least three corrugation crests located directly behind one another in the direction of the longitudinal extension. Due to the selected minimum length of the working surface, a support of the working surface extending over several corrugation crests can thus be ensured during machining. This makes it possible to achieve better and more uniform leveling of at least the corrugation crests to be formed.

Another procedure is characterized in that a plurality of forming tools is provided and the forming tools are arranged offset from one another over the profile cross section to be machined. This makes it possible to machine a larger section of the profile cross-section in the second machining step in a single operation.

Furthermore, a procedure is advantageous in which a plurality of forming tools is provided, each of the forming tools being provided with a dome-shaped hammer head. By selecting a plurality of forming tools, which are preferably pin- or needle-shaped, an even more individual leveling of at least the corrugation crests can be achieved.

A further advantageous procedure is characterized in that a maximum forming path of the plurality of forming tools ends at least before reaching the corrugation trough. However, the maximum forming path of the plurality of forming tools can also end at the trough of the corrugation. Furthermore, the maximum forming path of the plurality of forming tools can extend beyond the corrugation trough in the direction of a rail foot into the material of the rail head of the rail. By defining and limiting the maximum forming path of the plurality of forming tools, the surface section of the running surface to be machined in the second machining step can thus be precisely predetermined and defined. Furthermore, the degree of forming of the corrugation crests can also be better predetermined.

A method variant in which the pulsating forming force is applied to the running surface to be machined by means of a blasting process and a plurality of blasting bodies is also advantageous. This also allows a mechanical forming effect to be applied at least to the corrugation crests or elevations to be leveled. Due to the movement of the blasting bodies, which can be formed by balls or similar bodies they contain a certain amount of kinetic energy, which is converted for the most part into the forming force to be applied when the individual blasting bodies strike the surface or running surface of the rail to be machined.

Another procedure is characterized by the blasting bodies being collected after the forming process by means of a collecting unit, in particular a suction device. This makes it possible to reuse blasting bodies that have already been used for a new treatment process. In addition, however, this also minimizes to the greatest possible extent any deposits and the associated possible environmental pollution in the area of the rail track.

A further advantageous procedure is characterized in that the amplitude of the surface corrugation in the normal direction with respect to the longitudinal extent of the running surface to be machined is reduced to an amplitude value originating from an amplitude value range whose lower limit is 0.001 mm, in particular 0.004 mm, and whose upper limit is 0.01 mm, in particular 0.008 mm. Thus, a very low surface corrugation can be achieved by the second machining step despite the previously performed removal process by means of a wheel cutter. As a result, the noise pollution that occurs during the operation of rail vehicles can be reduced to a large extend. The amplitude values are to be selected and leveled within such a limit that this lies below the periodic surface structure contributing to the acoustic emission.

A method variant in which the surface corrugation is reduced and/or modified to a center-line roughness Ra of less than 0.004 mm is also advantageous. This also enables a high degree of leveling and, associated with this, very low surface corrugation to be achieved.

Another procedure is characterized by the fact that, during the first machining step, the corrugation crests located directly behind one another in the direction of the longitudinal extension are formed at a distance value from one another which originates from a distance value range whose lower limit is 1.0 mm, in particular 1.8 mm, and whose upper limit is 14 mm, in particular 10 mm. Thus, depending on the relevant machining parameters, such as the rotational speed of the milling wheel, the number of milling cutting edges distributed over the circumference of the milling wheel, and the relative speed between the milling wheel and the rail, the surface corrugation can be specified and determined within predetermined limits.

Finally, a procedure is advantageous in which the travel speed of the machining vehicle during the reprofiling process is carried out with a speed value originating from a speed value range whose lower limit is 3 m/min, in particular 5 m/min, and whose upper limit is 40 m/min, in particular 30 m/min. By selecting the relative speed between the rail and the machining unit, it is thus possible to exert an additional influence on the flatness of the running surface obtained after the second machining step.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 3 shows a rail head of the rail after the first machining step and a forming tool of the second machining aggregate applying the plastic forming force, in side view;

FIG. 4 shows a further rail head of the rail after the first machining step and a plurality of forming tools applying the plastic forming force, in side view FIG. 5 shows another rail head of the rail after the first machining step and another possibility for applying the plastic forming force by means of a shot peening process, in side view.

DETAILED DESCRIPTION OF PREFERRED EMBODIMENTS

By way of introduction, it should be noted that in the differently described embodiments, the same parts are denoted by the same reference numbers or the same component designations, whereby the disclosures made throughout the description can be transposed in terms of meaning to the same parts bearing the same reference numbers or the same component designations. Also, the positional indications selected in the description, such as top, bottom, side, etc., are related to the directly described as well as depicted figure, and these positional indications are to be transposed in terms of meaning to the new position in the event of a change of position.

The term "in particular" is understood in the following to mean a possible more special design or more detailed specification of an object or a process step, but does not necessarily have to represent a mandatory, preferred embodiment of the same or a mandatory procedure.

By way of introduction, it should be mentioned that the reprofiling method described below can be carried out on the one hand with a stationary positioned machining plant or on the other hand also by means of a mobile machining plant. In the following, the case is described in which a mobile machining plant is provided, which is traversed along the at least one rail to be machined.

FIGS. 1 to 5, which basically belong together, show and describe various possibilities and arrangements of machining components used for reprofiling rails.

Figure 1:
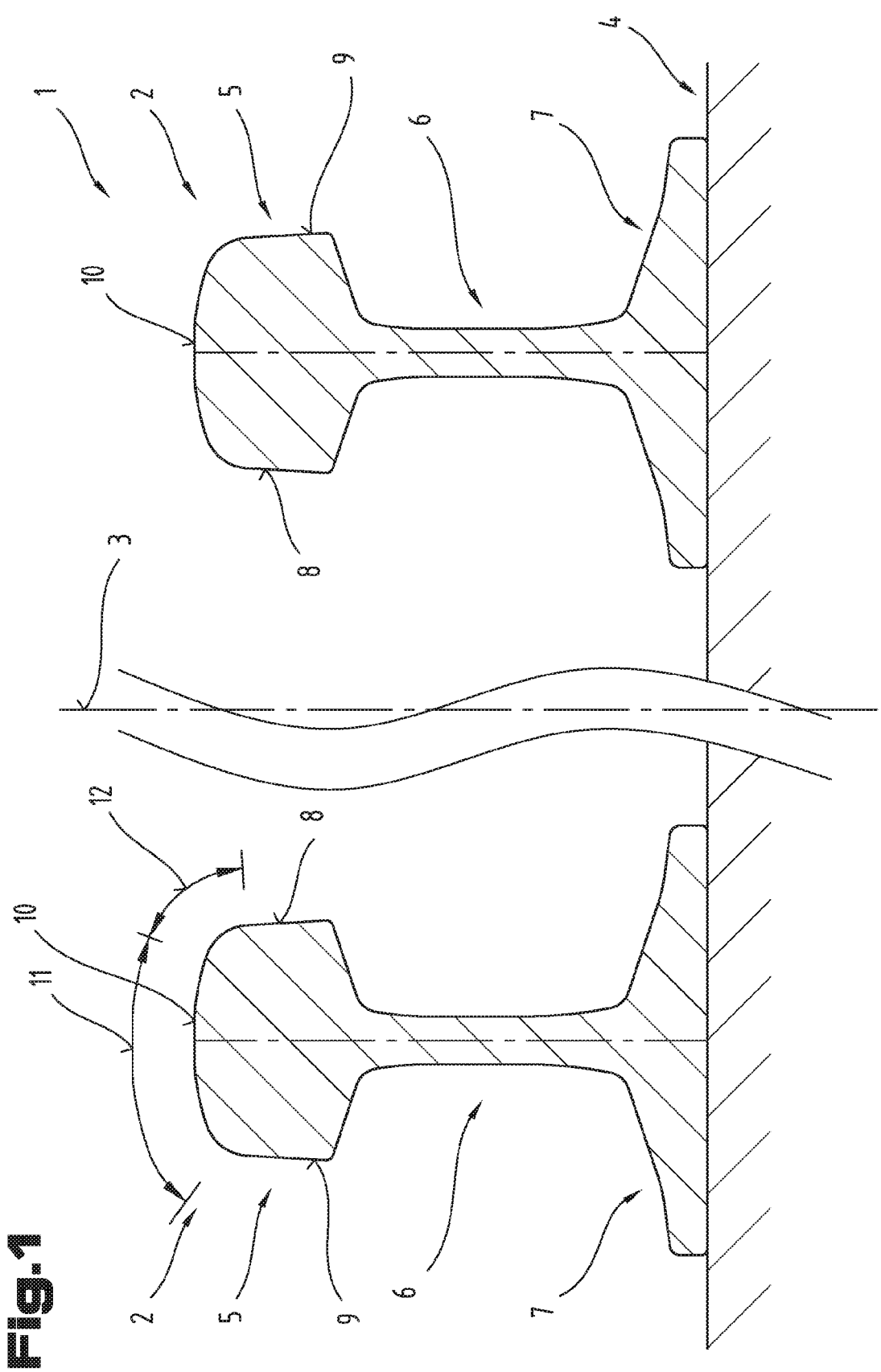
FIG. 1 shows a rail track with a nominal profile of the rails, in cross-section and enlarged view.

FIG. 1 shows a cross-section through a rail track 1 comprising at least one pair of rails 2 which rails 2 are arranged parallel to one another at a distance of one track gauge from one another. The rails 2 are spaced at regular, preferably short intervals, mostly on sleepers laid transversely to a track axis 3 sleepers 4 made of concrete, steel, wood or plastic, whereby the representation of fastening elements has been omitted here. The track axis 3 forms a central axis, in which a central plane with a vertical alignment can also extend. The rails 2 of the rail track 1 together with the small iron and the bedding form the superstructure of a rail track. In principle, the rails 2 shown and described here basically form linear load-bearing and guiding elements in the rail system and thus the specified track for rail vehicles located thereon. It should be mentioned that the cross-section of the rails 2 can be formed in a wide variety of ways and this cross-section has only been selected as an example.

Each of the rails 2 seen in its cross-section comprises a rail head 5, a rail web 6 and a rail foot 7. The rail head 5 is supported by the rail web 6 and the rail foot 7 is in turn fastened to the sleeper 4 or other support or base.

The part of the rail head 5 that can be touched by the wheels of a rail vehicle is referred to in this context as the running surface 10. The wheel flanges of the rail vehicles, which are not shown, are arranged on the sides of the rails 2 facing each other, whereby these are also those sides which face the track axis 3 or the center of the track. The rail head 5 is laterally separated by an inner side face 8 and an outer side surface 9 arranged opposite to it. The cross-section of the rail head between the side faces 8 and 9 can be regarded in the broadest sense as the running surface 10 of the rail 2. The running surface 10 of each rail 2 can consist of a driving surface 11 and a travel edge 12. The driving surface 11 is arranged running along an upper side of the rail head 5, with the travel edge 12 forming the transition to the inner side surface 8 which faces the center of the track or the track axis 3.

On the running surface 10 of laid rails 2, damage occurs over time, such as corrosion, wear, cracks, driving surface defects such as striations, corrugations, damage caused by skidding wheels, pitting, changes in the cross sectional profile such as flattening of the cambered driving surface, ridges, bulges, etc. The signs of wear and/or damage, which are essentially confined to the outermost area of the running surface 10 can be largely eliminated by reprofiling the rail 2. In most cases, a chip-removing machining method is used to remove the worn or damaged material of the rail head 5 on the surface of the rail 2 and the machined rail head 5 is approximated as far as possible to a target profile of the rail 2.

The process according to the invention relates to the profiling or reprofiling of the running surface 10, in particular its driving surface 11 and/or driving edge 12, whereby the machining also extends beyond the inner side surface 8. However, it would also be possible for the machining to extend beyond the driving surface 11 over the outer lateral surface 9.

Figure 2:
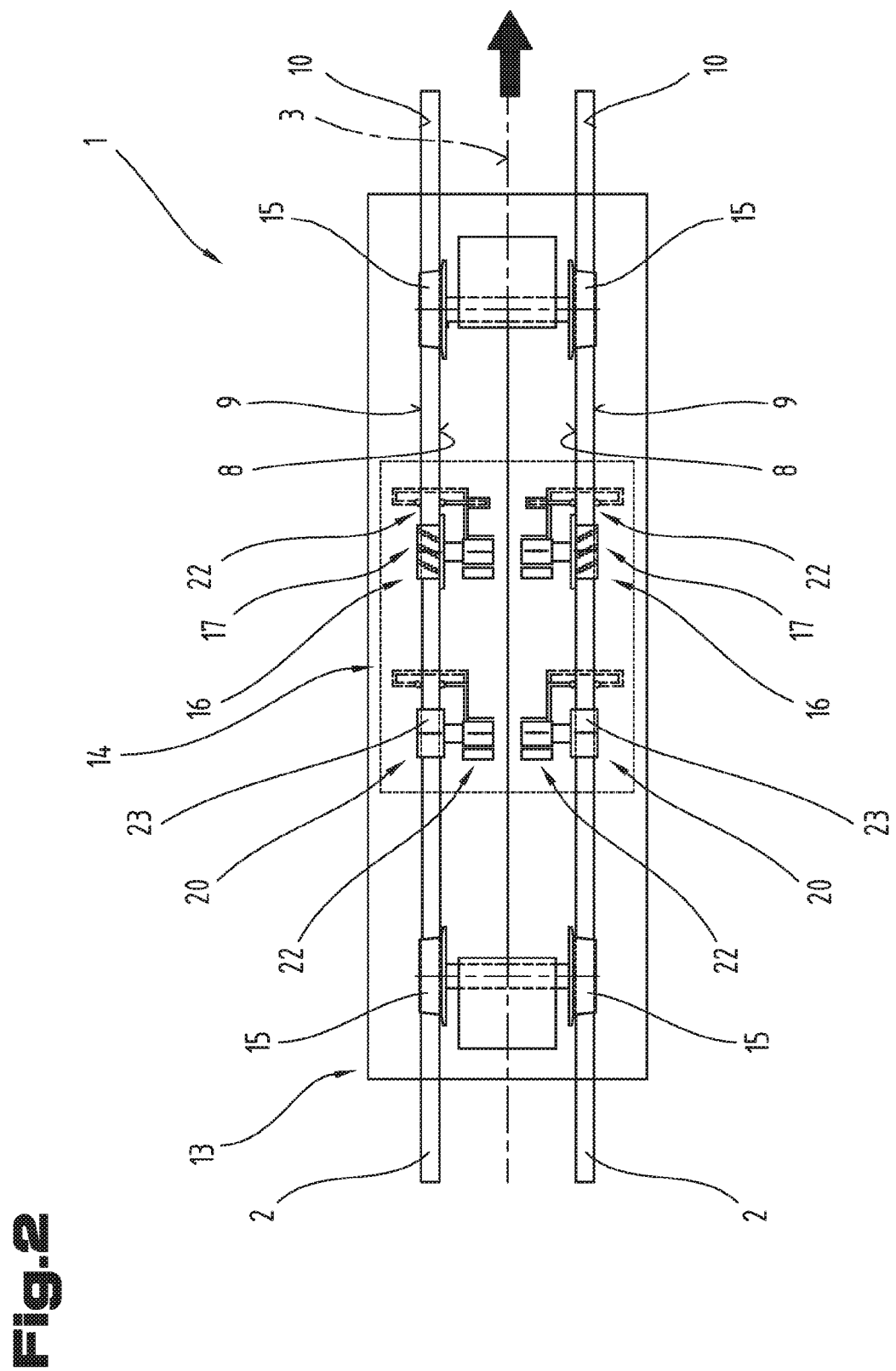
FIG. 2 shows a top view of the rail track with a machining vehicle located thereon with the machining unit and its machining aggregates.

FIG. 2 shows in plan view the rail track formed by the rails 2 and a machining vehicle 13 supported and guided on the rails 2 with its machining unit 14, shown in a highly stylized and simplified form. The possible machining direction and thus the direction of movement of the machining vehicle 13 is indicated by an arrow, here from left to right. Only wheel sets 15 spaced from one another in the direction of the longitudinal axis of the rail track are indicated of which at least one of the wheel sets 15 can be in drive connection with a drive means. For the sake of clarity, a base frame of the machining vehicle 13 has been omitted and only the outlines of the machining vehicle 13 are indicated.

The machining unit 14 comprises at least one first machining aggregate 16 with at least one rotationally driven, chip-removing machining tool 17. The support of the first machining aggregate 16 can be provided, for example, by means of sliding shoes, whereby separate guide means can be provided for guiding and relative alignment with respect to the rail 2. It is preferably provided that each of the both rails 2 can be assigned its own first machining aggregate 16 for its machining. In the present embodiment, the at least one machining tool 17 is formed as a milling wheel with a plurality of cutter head cutting edges arranged circumferentially one behind the other and aligned along the rail head profile to be reprofiled. The cutter head cutting edges are not designated in more detail and are only indicated in simplified form. The cutter head cutting edges are each combined from cutter head sets arranged distributed over the circumference, each cutter head set consisting of several cutter heads adapted in their orientation and alignment to the profile of the rail head 5. The rotary motion of the milling wheel forms a separate machining track from the cutter heads of each cutter head set, which are arranged one behind the other in the circumferential direction. The representation or more detailed designation of various drive means for the first machining aggregate 16 and its machining tool 17 has been omitted for the sake of clarity.

Here, FIG. 3 shows a side view of the rail 2, wherein the surface corrugation of only one track formed by the cutter head cutting edges described above, which occurs during the removal process due to reprofiling, is strongly exaggerated and not to scale. The surface corrugation is caused by the relative movement between the at least one rail 2 and the machining unit 14. For example, the travel speed of the machining vehicle 13 or the travel speed of the rail 2 during the reprofiling process can be carried out with a speed value originating from a speed value range whose lower limit is 3 m/min, in particular 5 m/min, and whose upper limit is 40 m/min, in particular 30 m/min.

Machining of the rail head 5 takes place in the section of its running surface 10 in a first machining step by means of the at least one chip-removing machining tool 17, wherein the material removal is carried out in a milling process in the first machining step. During this material removal, which is carried out in the direction of the longitudinal extension of the rail 2 the previously described surface corrugation with corrugation crests 18 and corrugation troughs 19 is formed. The corrugation crests 18 can also be referred to as elevations and the corrugation troughs 19 can also be called indentations.

The surface corrugation, which is produced in the course of the first machining step by the milling process, can be formed, for example, by corrugation crests 18 located directly in a track or milling track as well as in the direction of the longitudinal extension one after the other in a distance value to each other which originates from a distance value range whose lower limit is 1.0 mm, in particular 1.8 mm, and whose upper limit is 14 mm, in particular 10 mm. The distance value is thereby dependent on the speed of the milling wheel, the number of cutter head sets and the relative speed between the rail 2 and the chip-removing machining tool 17. The higher the speed difference and/or the lower the speed of the milling wheel, the longer the distance value.

As can be seen from a synopsis of FIG. 2 and FIG. 3, the machining unit 14 also comprises at least one second machining aggregate 20 which is intended to reduce the surface corrugation described above. However, this should be done without further material removal in the area of the rail head 5.

The reduction and the associated leveling of at least the corrugation crests 18 are to be achieved by means of plastic forming. As a result of the plastic forming, the material or the raw material of the rail 2 is slightly displaced, which improves the straightness of the running surface 10. The slight displacement or rearrangement of the material occurs mainly and to a predominant extent or proportion at the corrugation crests 18, this displacement occurring to a predominant extent in the direction of the longitudinal extension of the rail 2. Thus, the respective corrugation crests 18 are preferably deformed by an applied forming force 21 into the respective corrugation troughs 19 arranged immediately adjacent or immediately beside them. This results in alignment with a predominantly rectilinear longitudinal course of the finished reprofiled running surface 10 of the rail 2.

To carry out plastic forming, it is necessary to apply at least one forming force 21 directed towards the running surface 10 to be machined. The forming force 21 can be applied by a wide variety of means, such as a second or a further machining tool. The at least one forming force 21 should be applied in a normal orientation with respect to the running surface 10 to be machined. Furthermore, it may be advantageous if the forming force 21 is applied in a pulsating manner. This can be done by means of electric and/or pneumatic and/or hydraulic drive means, as generally known from the prior art.

Pulsating application is understood here to mean that a non-continuously transmitted energy (impact energy) is introduced into the material via a workpiece surface. The forming or cold deformation of the rail material occurs due to the energy dissipation when the impact energy hits the workpiece surface, which can be referred to as plastic dissipation energy.

The at least one forming force 21 applied in a pulsating manner can also be applied with a swelling intensity. Furthermore, the frequency of the at least one forming force 21 applied in a pulsating manner can also be applied uniformly or with a changing frequency. Thus, the number of oscillations per second can be adapted to the respective operating conditions or requirements.

As mentioned above, the machining unit 14 with the machining aggregates 16, 20 can be arranged in a stationary position and the rail 2 to be machined is moved by the machining unit 14 during the machining steps relative to the machining unit 14 in the direction of its longitudinal extension.

Preferably, however, the reworking and reprofiling is carried out on the rail track 1 laid in the track bed. In this case, the machining unit 14 is disposed on the machining vehicle 13 or is held thereon. The machining vehicle 13 is traversed along the laid track 1 formed by rails 2, whereby the machining of the running surface 10 to be machined is carried out during the traversing movement of the machining vehicle 13.

In order to achieve an alignment between the rail 2 to be machined and at least one of the machining units 16, 20 at least one guiding means 22 for guiding at least one of the machining aggregates 16, 20 can be provided vertically and/or laterally with respect to the rail head 5 to be machined, as is generally known. Preferably, each of the machining aggregates 16, 20 can be assigned its own guide means 22 and be coupled to it.

As can be seen from FIG. 3, the second machining aggregate 20 can comprise at least one forming tool 23. The at least one forming tool 23 is shown in a position raised from the rail surface (running surface 10) to be machined. The at least one forming tool 23 comprises a working surface 24 facing the running surfaces 10 of the rail head 5 to be machined. The working surface 24 itself is flat and has a longitudinal extension which extends over at least two, but preferably over at least three, corrugation crests 18 located directly one behind the other in the direction of the longitudinal extension. This is indicated in each case in FIG. 3 and the following FIG. 4. The longitudinal extension of the working surface 24 can also extend over a larger number of corrugation crests 18 located directly behind each other.

Thus the working surface 24 covers at least one corrugation trough 19 but preferably at least two corrugation troughs 19 in the direction of the longitudinal extension of the rail 2. This ensures that the working surface 24 always comes into forming contact with at least two of the corrugation crests 18, even during the second machining step. It should be mentioned that, for example, a separate forming tool can be assigned to each of the previously described tracks of the individual cutter head cutting edges 23. Then several forming tools 23 are provided, whereby the forming tools 23 are arranged offset to one another over the profile cross section to be machined.

In this somewhat larger and more voluminous at least one forming tool 23, the at least one forming force 21 applied in a pulsating manner can originate from a force value range whose lower limit is 20 kN, in particular 40 kN, and whose upper limit is 80 kN, in particular 60 kN.

Furthermore, the at least one forming force 21 applied in a pulsating manner can be applied at a frequency which originates from a frequency value range whose lower limit is 100 Hertz (Hz), in particular 150 Hertz (Hz), and whose upper limit is 350 Hertz (Hz), in particular 300 Hertz (Hz).

FIG. 4 shows a further arrangement and design possibility of the second machining aggregate 20 on a rail 2 to be machined in a side view of the rail 2. Here again, the surface corrugation of only one track formed by the previously described cutter head cutting edges, which occurs in the course of the removal process due to reprofiling, is strongly exaggerated and not to scale.

The second machining aggregate 20 in this embodiment comprises a plurality of forming tools 25. Each of the forming tools 25 is pin-shaped or needle-shaped and each can be provided with a dome-shaped hammer head, whereby the dome-shaped hammer heads are indicated by the dashed lines. A maximum forming path of the plurality of forming tools 25 should be dimensioned so that it ends at least before the corrugation trough 19. However, the maximum forming path can also be dimensioned so that it ends at the corrugation trough 19. Irrespective of this, however, it would also be possible for the forming path to extend beyond the corrugation trough in the direction of the rail foot 7 into the material of the rail head 5. It is also shown that the individual forming tools 25 are not all displaced simultaneously in the direction of the running surface 10 to be formed, but rather the forming movement can take place in a pulsating and alternating manner by means of the pin-shaped or needle-shaped plurality of forming tools 25. For this reason, the machining ends of the forming tools 25 are shown at different distances from the running surface 10.

In this example of applying the pulsating forming force 21, it can originate from a range of force values whose lower limit is 150 N, in particular 650 N, and whose upper limit is 1.5 kN, in particular 1.0 kN.

Thus, the at least one forming force 21 applied in a pulsating manner can be applied at a frequency which originates from a frequency value range whose lower limit is 500 hertz (Hz), in particular 1 kilohertz (kHz), and whose upper limit is 3 kilohertz (kHz), in particular 2 kilohertz (kHz).

In FIG. 5 it is also indicated that the forming force 21 applied by the second machining aggregate 20 can be applied by means of a shot peening process. In the shot peening process, the plurality of individual shot peening balls 26 are hurled or moved at a predetermined speed onto the running surface 10 to be machined at a predetermined speed, thus building up the forming force 21. In this machining step with the balls 26 they are to be collected again after the forming process by means of a collecting unit, in particular a suction device 27. The collected balls 26 can then be reused. The feeding of the individual balls 26 is schematically indicated, with the balls being fed at a predetermined speed in a central feed channel 28 which is directed in the direction of the running surface 10 to be machined. After impact on the running surface 10 and the associated mechanical cold forming, the balls 26 are removed by the collecting unit 27, which is arranged externally around the feed channel 28 by means of a suction process. This illustration is a schematic simplification, whereby an oblique or angular alignment of the ball jet on the running surface 10 is also possible.

The shot peening process described above involves specially designed blasting bodies which have a spherical shape. It should also be noted at this point that the forming force 21 applied by the second machining unit 20 can be applied not only by balls 26 but also by so-called blasting bodies 29 of any other design, as indicated by the dashed lines, also with pulsating energy transfer. The spatial shape of the individual blasting bodies 29 can also deviate from the spherical shape and be selected as desired. For example, a sandblasting process could also be used for the application and the associated plastic forming. For example, metallic, mineral or ceramic materials can be selected as materials for the blasting bodies 29.

In this described example for the application of the pulsating forming force 21, this can originate from a force value range whose lower limit is 20 N, in particular 30 N, and whose upper limit is 50 N, in particular 40 N.

In this case, the at least one forming force 21 applied in a pulsating manner can be applied at a frequency which originates from a frequency value range whose lower limit is 5 kilohertz (kHz), in particular 10 kilohertz (kHz), and whose upper limit is 25 kilohertz (kHz), in particular 20 kilohertz (kHz).

In all the second machining steps described above and carried out by different means, the amplitude of the surface corrugation in the normal direction with respect to the longitudinal extension of the machined running surface 10 is to be reduced to an amplitude value originating from an amplitude value range whose lower limit is 0.001 mm, in particular 0.004 mm, and whose upper limit is 0.01 mm, in particular 0.008 mm.

Due to the plastic forming, the surface corrugation can also be reduced and/or modified to a center-line roughness Ra of less than 0.004 mm. In addition, a surface hardening of at least the treated sections of the running surface 10 can be achieved.

Furthermore, the plastic forming process should be carried out below the recrystallization temperature of the respective rail material of the rail 2. Thus, thermal stresses and unwanted microstructural changes can be prevented, at least in the surface area.

In all the reprofiling operations described above, material is first removed mechanically at least in the region of the rail head 5 by means of at least one chip-removing machining tool 17, in particular a wheel cutter. This is followed, and subsequently followed, by further mechanical forming of the material of the previously machined rail head 5. No further material removal takes place in the second or subsequent working step, but only mechanical forming and the associated smoothing of the surface corrugation.

The embodiment examples show possible embodiment variants, whereby it should be noted at this point that the invention is not limited to the specifically depicted embodiment variants thereof, but rather also various combinations of the individual embodiment variants with each other are possible and this variation possibility is due to the teaching for technical action by the present invention in the skill of the person skilled in this technical field.

The scope of protection is determined by the claims. However, the description and the drawings are to be consulted for the interpretation of the claims. Individual features or combinations of features from the different embodiments shown and described may constitute independent inventive solutions in their own right. The object underlying the independent inventive solutions can be taken from the description.

All indications of value ranges in the present description are to be understood as including any and all subranges thereof, e.g. the indication 1 to 10 is to be understood as including all subranges starting from and including the lower limit 1 up to and including the upper limit 10, i.e. all subranges starting with a lower limit of 1 or greater and ending with an upper limit of 10 or less, e.g. 1 to 1.7, or 3.2 to 8.1, or 5.5 to 10.

Finally, for the sake of order, it should be noted that, for a better understanding of the layout, elements have been shown partially out of scale and/or enlarged and/or reduced in size.

| List of reference numbers | |
|---|---|
| 1 | Rail track |
| 2 | Rail |
| 3 | Track axis |
| 4 | Sleeper |
| 5 | Rail head |
| 6 | Rail web |
| 7 | Rail foot |
| 8 | Inner side face |
| 9 | Outer side face |
| 10 | Running surface |
| 11 | Driving surface |
| 12 | Driving edge |
| 13 | Machining vehicle |
| 14 | Machining unit |
| 15 | Wheel set |
| 16 | First machining aggregate |
| 17 | Machining tool |
| 18 | Corrugation crest |
| 19 | Corrugation trough |
| 20 | Second machining aggregate |
| 21 | Forming force |
| 22 | Guide means |
| 23 | Forming tool |
| 24 | Work surface |
| 25 | Forming tool |
| 26 | Ball |
| 27 | Collecting unit |
| 28 | Feed channel |
| 29 | Blasting body |

The invention claimed is:

1. A method for reprofiling at least a section of a running surface of a rail head of at least one rail of rails forming a laid rail track, the method comprising the following steps:
providing a machining vehicle, the machining vehicle being movable along the rail track,
providing a machining unit, the machining unit being arranged on the machining vehicle and the machining of the running surface to be machined being carried out during the travel of the machining vehicle, the machining unit comprising
at least a first machining aggregate with at least one rotationally driven chip-removing machining tool, wherein the at least one machining tool is formed as a milling wheel with a plurality of cutter head cutting edges arranged circumferentially one behind the other and aligned along a rail head profile of the rail head to be reprofiled,
at least one second machining aggregate,
machining the rail head in the section of the running surface in a first machining step using the at least one chip-removing machining tool, wherein in the first machining step the material removal is carried out in a milling process, and a surface corrugation with corrugation crests (18) and corrugation troughs is formed during the material removal in a direction of a longitudinal extension of the at least one rail, and the surface corrugation is reduced and/or modified in a subsequent second machining step using the second machining aggregate,
wherein during the reduction of the surface corrugation in the second machining step, at least the corrugation crests are plastically deformed and leveled, and
wherein the plastic deformation of at least the corrugation crests is performed using at least one forming force directed towards the running surface to be machined, wherein
the at least one forming force is applied in a pulsating manner and the material of the rail is displaced slightly in the process and wherein in the second machining step there is no continuous contact of a machining tool of the second machining aggregate with the running surface to be machined.

2. The method according to claim 1, wherein at least one guide means for guiding at least one of the machining aggregates vertically and/or laterally relative to the rail head to be machined is provided.

3. The method according to claim 1, wherein the at least one forming force is applied in a normal orientation towards the running surface to be machined.

4. The method according to claim 1, wherein the at least one forming force applied in a pulsating manner originates from a force value range whose lower limit is 20 N and whose upper limit is 80 kN.

5. The method according to claim 1, wherein the at least one forming force applied in a pulsating manner is applied with a swelling intensity.

6. The method according to claim 1, wherein the at least one forming force applied in a pulsating manner is applied at a frequency which originates from a frequency value range whose lower limit is 100 Hertz (Hz) and whose upper limit is 25 kilohertz (kHz).

7. The method according to claim 6, wherein the at least one forming force applied in a pulsating manner is applied with a uniform frequency or with a changing frequency.

8. The method according to claim 1, wherein the second machining aggregate comprises at least one forming tool.

9. The method according to claim 8, wherein the at least one forming tool has a working surface facing the running surface of the rail head and extending in a longitudinal direction of the working surface over at least two corrugation crests of the corrugation crests.

10. The method according to claim 8, wherein a plurality of forming tools is provided and the forming tools are arranged offset from one another over a profile cross section of the rail head profile of the rail head (5) to be machined.

11. The method according to claim 1, wherein a plurality of forming tools is provided, each of the forming tools being provided with a dome-shaped hammer head.

12. The method according to claim 11, wherein the plurality of forming tools travel in a forming path ending before the forming tools reach a corrugation trough of the corrugation troughs.

13. The method according to claim 11, wherein of the plurality of forming tools travel in a forming path ending at a corrugation trough of the corrugation troughs.

14. The method according to claim 11, wherein the plurality of forming tools travel in a forming path extending in a direction of a rail foot beyond a corrugation trough of the corrugation troughs into the rail head of the rail.

15. The method according to claim 1, wherein the forming force is applied towards the running surface using a blasting process and a plurality of blasting bodies.

16. The method according to claim 15, wherein the blasting bodies are collected after the forming process using a collecting unit (27).

17. The method according to claim 1, wherein the amplitude of the surface corrugation in the normal direction with respect to the longitudinal extension of the running surface to be machined is reduced to an amplitude value originating from an amplitude value range whose lower limit is 0.001 mm and whose upper limit is 0.01 mm.

18. The method according to claim 1, wherein the surface corrugation is reduced and/or is modified to a center-line roughness Ra of less than 0.004 mm.

19. The method according to claim 1, wherein in the first machining step the corrugation crests are formed at a distance value from one another which originates from a distance value range whose lower limit is 1.0 mm and whose upper limit is 14 mm.

20. The method according to claim 1, wherein a travel speed of the machining vehicle during the reprofiling process is carried out with a speed value which originates from a speed value range whose lower limit is 3 m/min and whose upper limit is 40 m/min.

* * * * *